US012462633B2

(12) United States Patent
Gröpper et al.

(10) Patent No.: US 12,462,633 B2
(45) Date of Patent: Nov. 4, 2025

(54) ARRANGEMENT FOR PROTECTING ACCESS TO AN APPARATUS FOR HANDLING VALUE DOCUMENTS

(71) Applicant: Diebold Nixdorf Systems GmbH, Paderborn (DE)

(72) Inventors: Sascha Gröpper, Geseke (DE); Richard Düsterhus, Paderborn (DE)

(73) Assignee: WINCOR NIXDORF INTERNATIONAL GMBH, Paderborn (DE)

(*) Notice: Subject to any disclaimer, the term of this patent is extended or adjusted under 35 U.S.C. 154(b) by 65 days.

(21) Appl. No.: 18/031,785

(22) PCT Filed: Oct. 15, 2021

(86) PCT No.: PCT/EP2021/078596
§ 371 (c)(1),
(2) Date: Oct. 20, 2023

(87) PCT Pub. No.: WO2022/079231
PCT Pub. Date: Apr. 21, 2022

(65) Prior Publication Data
US 2024/0321032 A1 Sep. 26, 2024

(30) Foreign Application Priority Data
Oct. 16, 2020 (EP) .................................... 20202215

(51) Int. Cl.
*G07D 11/14* (2019.01)
*G07D 11/125* (2019.01)
*G07D 11/40* (2019.01)

(52) U.S. Cl.
CPC ........... *G07D 11/14* (2019.01); *G07D 11/125* (2019.01); *G07D 11/40* (2019.01)

(58) Field of Classification Search
CPC ...... G07D 11/14; G07D 11/125; G07D 11/40; G07D 11/24; G07D 11/30; G07D 11/23
(Continued)

(56) References Cited

U.S. PATENT DOCUMENTS

2013/0307210 A1 11/2013 Takada
2020/0027319 A1* 1/2020 Beskitt .................. G07F 19/202

FOREIGN PATENT DOCUMENTS

EP 1209633 A2 5/2002
EP 2151805 A1 2/2010
(Continued)

OTHER PUBLICATIONS

International Search Report filed in the corresponding PCT Application dated Dec. 15, 2021; 2 pages.

*Primary Examiner* — Edwyn Labaze
(74) *Attorney, Agent, or Firm* — Black McCuskey

(57) ABSTRACT

An arrangement for protecting access to at least one opening (20) in a wall of a safe module (21) of an apparatus (100, 102) for handling value documents comprises a structural unit (40, 202, 302) which, with the aid of two telescopic rails (204, 206, 305*a*, 305*b*), is arranged and connected to the safe module (21) such that, when the telescopic rails (204, 206, 305*a*, 305*b*) are retracted, value documents (13) can be transported through the opening (20) between the safe module (21) and the structural unit (40, 202, 302). The structural unit (40, 202, 302) has at least one protection plate (214, 312) arranged between the telescopic rails (204, 206, 305*a*, 305*b*), wherein the protection plate (214, 312) is at an adjustable distance (240) from an outer side (224) of the wall of the safe module (21). The structural unit (40, 202, 302) may also comprise a protection cover (208, 318) arranged around the opening (20). The structural unit (40, 202, 302) may also comprise at least one first plate (306) and the safe module (21) may comprise a second plate (308), wherein the
(Continued)

Figure 1:
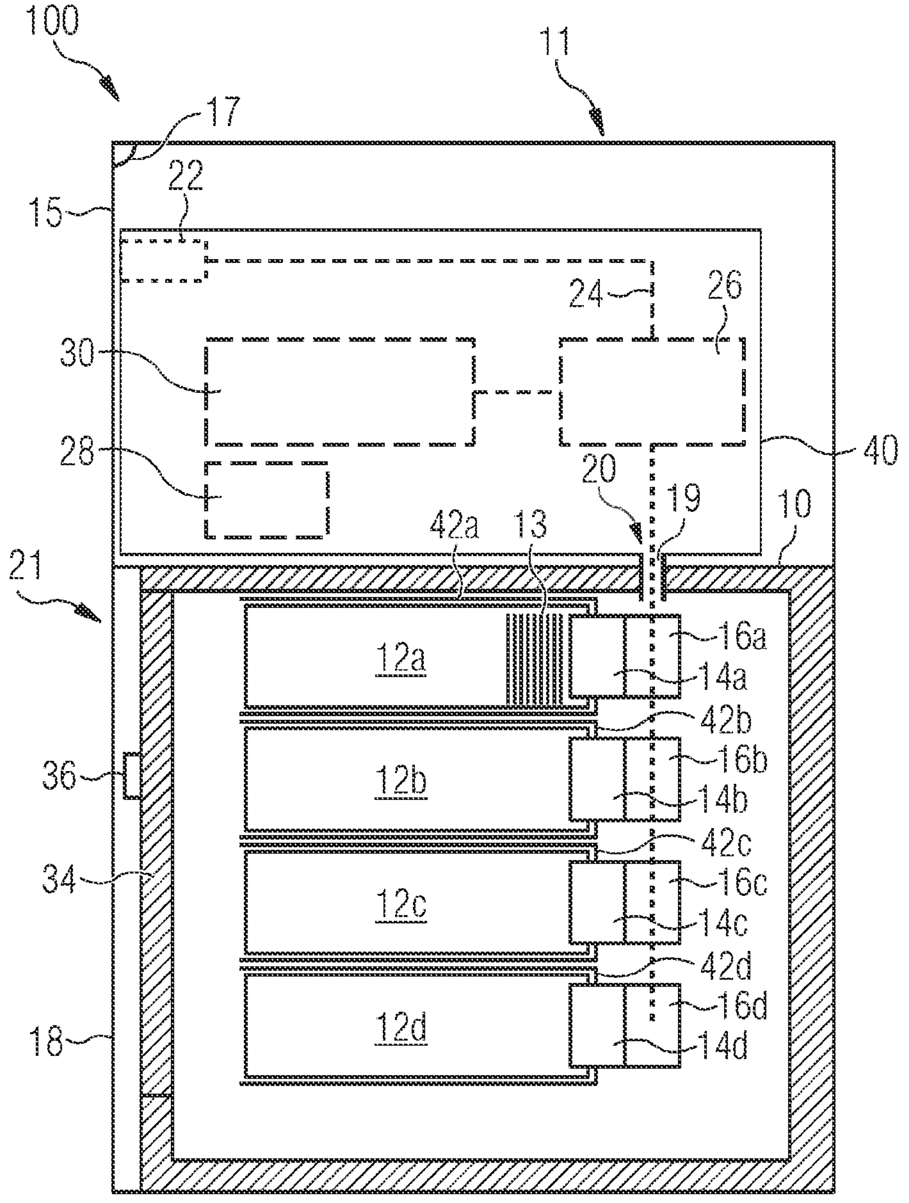

first plate (306) is arranged between the outer side (224) of the safe module (21) and a part of the second plate (308) running at a distance from the outer side (224) when the structural unit (40, 202, 302) is retracted.

15 Claims, 16 Drawing Sheets

(58) Field of Classification Search
USPC .................................................. 235/379, 375
See application file for complete search history.

(56) References Cited

FOREIGN PATENT DOCUMENTS

| | | | | | |
|---|---|---|---|---|---|
| EP | 3703022 | A1 | * | 9/2020 | ............. G06Q 20/18 |
| WO | WO-2017203276 | A1 | * | 11/2017 | ............. G07D 11/12 |

* cited by examiner

ARRANGEMENT FOR PROTECTING ACCESS TO AN APPARATUS FOR HANDLING VALUE DOCUMENTS

The invention relates to an arrangement for securing access to at least one opening in a wall of a safe module of a device for handling paper money with a structural unit comprising at least one securing metal plate.

Devices for handling paper money, especially paper money stored in safe modules, are a target for criminal third parties. One known method of gaining unauthorized access to the stored paper money in a device safe is to blow up the safe. In this so-called automatic machine detonation, an ignitable mixture, for example air with propane gas or acetylene, is usually fed into the interior of the safe and detonated. Alternatively, solid explosives or other explosives may be used. The aim of the explosion is to damage the safe to such an extent that the contents, in particular the paper money stored inside, can be removed. The explosives are brought into the interior of the safe, in particular, through openings required by the design.

It is possible to make an attack on a paper money handling device more difficult by monitoring and restricting access to the device, for example by placing it in an interior of a bank branch.

The disadvantage here is that the choice of installation site is limited.

It is the task of the invention to provide an arrangement for securing access to a device for handling paper money, so that access, in particular to openings in a safe module of the device, is prevented or at least made very difficult.

This task is solved by an arrangement having the features of claims 1, 2 and 3, respectively. Advantageous further embodiments are given in the dependent claims.

An arrangement for securing access to at least one opening in a wall of a safe module of a device for handling paper money comprises a structural unit which is arranged by means of two telescopic rails and is connected to the safe module in such a way that paper money can be transported through the opening between the safe module and the structural unit in a retracted state of the telescopic rails. The structural unit has at least one securing plate arranged between the telescopic rails, the securing plate having an adjustable distance to an outer side of the wall of the safe module.

A further arrangement for securing access to at least one opening in a wall of a safe module of a device for handling paper money comprises a structural unit which is arranged by means of two telescopic rails and is connected to the safe module in such a way that, in a retracted state of the telescopic rails, paper money can be transported through the opening between the safe module and the structural unit. The structural unit has at least a first plate, wherein the safe module comprises a second plate which is fixedly connected to the safe module, and wherein the first plate in the retracted state of the structural unit is arranged between the outside of the safe module and a portion of the second plate extending at a distance from the outside. In an extended state of the structural unit, the first plate is preferably not arranged between the exterior of the safe module and the portion of the second plate extending at a distance from the exterior. Furthermore, the distance between the first plate and the second plate has a value in the range of 0.1 mm to 1 cm.

A further arrangement for securing access to at least one opening in a wall of a safe module of a device for handling paper money comprises a structural unit which is arranged by means of two telescopic rails and is connected to the safe module in such a way that, in a retracted state of the telescopic rails, paper money can be transported through the opening between the safe module and the structural unit. The structural unit comprises a securing hood arranged about the opening, the securing hood having at least four side walls.

Advantageously, the structural unit is arranged between two telescopic rails and is extendable by means of the telescopic rails in an extension direction of the telescopic rails and is movable between the retracted state and an extended state. This ensures that elements of the device are easily accessible and that the device can be easily maintained.

It is advantageous if the extension direction of the telescopic rails runs parallel to the outside of the wall of the safe module. This ensures that paper money can be transported between the safe module and the structural unit particularly easily and securely.

Furthermore, it is advantageous if the structural unit additionally comprises at least two securing elements, each of which is in engagement with one of the telescopic rails in the retracted state of the structural unit. In particular, the securing elements can be pin-shaped or block-shaped or a combination of both. This ensures that the structural unit is particularly secured against prying open in its retracted state.

It is particularly advantageous if the securing elements engage in the telescopic rails from a direction parallel to the direction of extension of the telescopic rails, and in particular are introduced into a region of the telescopic rails from this direction by a movement of the structural unit from the extended state to the retracted state. This ensures that the securing elements have a particularly small distance to the telescopic rails.

It is particularly advantageous if the securing elements engage in the telescopic rails against the direction in which the telescopic rails are pulled out. This ensures that the securing elements only engage in the telescopic rail in a retracted state.

In addition, it is advantageous if the securing elements engage in the telescopic rails in such a way that movement of the securing element in at least one direction perpendicular to the outside of the wall is not possible, and thus movement of the structural unit in the same direction is not possible.

This ensures that the structural unit is particularly well secured against levering open in its retracted state.

It is advantageous if the securing plate is parallel to the outside of the wall. This ensures that the securing plate has a uniform distance to the outside of the wall.

Furthermore, it is advantageous if the securing plate comprises a height-adjustable portion with the aid of which the distance of the securing plate to the outside of the wall of the safe module can be adjusted, in particular to a value in a range from 0.1 mm to 3 mm, preferably in a range from 0.3 mm to 1 mm, in particular to a distance of 0.5 mm. This ensures that the structural unit in its retracted state is especially secured against levering.

It is also advantageous if, in a retracted state of the structural unit, the securing plate is arranged at and connected to the front end of the telescopic rails in the pull-out direction. This ensures that this side of the structural unit is particularly well secured.

It is advantageous if the securing plate is arranged at a front end of the structural unit in the pull-out direction. This ensures that the accessible end of the structural unit is particularly well secured.

It is particularly advantageous if the first plate is arranged at a rear end of the structural unit in the pull-out direction and the second plate is arranged at a corresponding rear side of the safe module. This ensures that the end of the structural unit that is opposite to the pull-out direction is also secured.

Furthermore, it is particularly advantageous if the securing hood comprises at least one locking element which can only be unlocked in an extended state of the structural unit by means of an unlocking element, so that the securing hood can be moved from a closed to an open position. The unlocking element can be unlocked manually or automatically in the extended position. This ensures that the securing hood provides particularly safe protection.

It is advantageous if the securing hood is made of metal, in particular steel, and/or has a wall thickness in the range from 1 mm to 10 mm, preferably in the range from 2 mm to 5 mm, in particular 3 mm. This ensures that the securing hood is particularly robust.

Further features and advantages result from the following description, which explains exemplary embodiments in more detail in conjunction with the attached figures.

Figure 2:
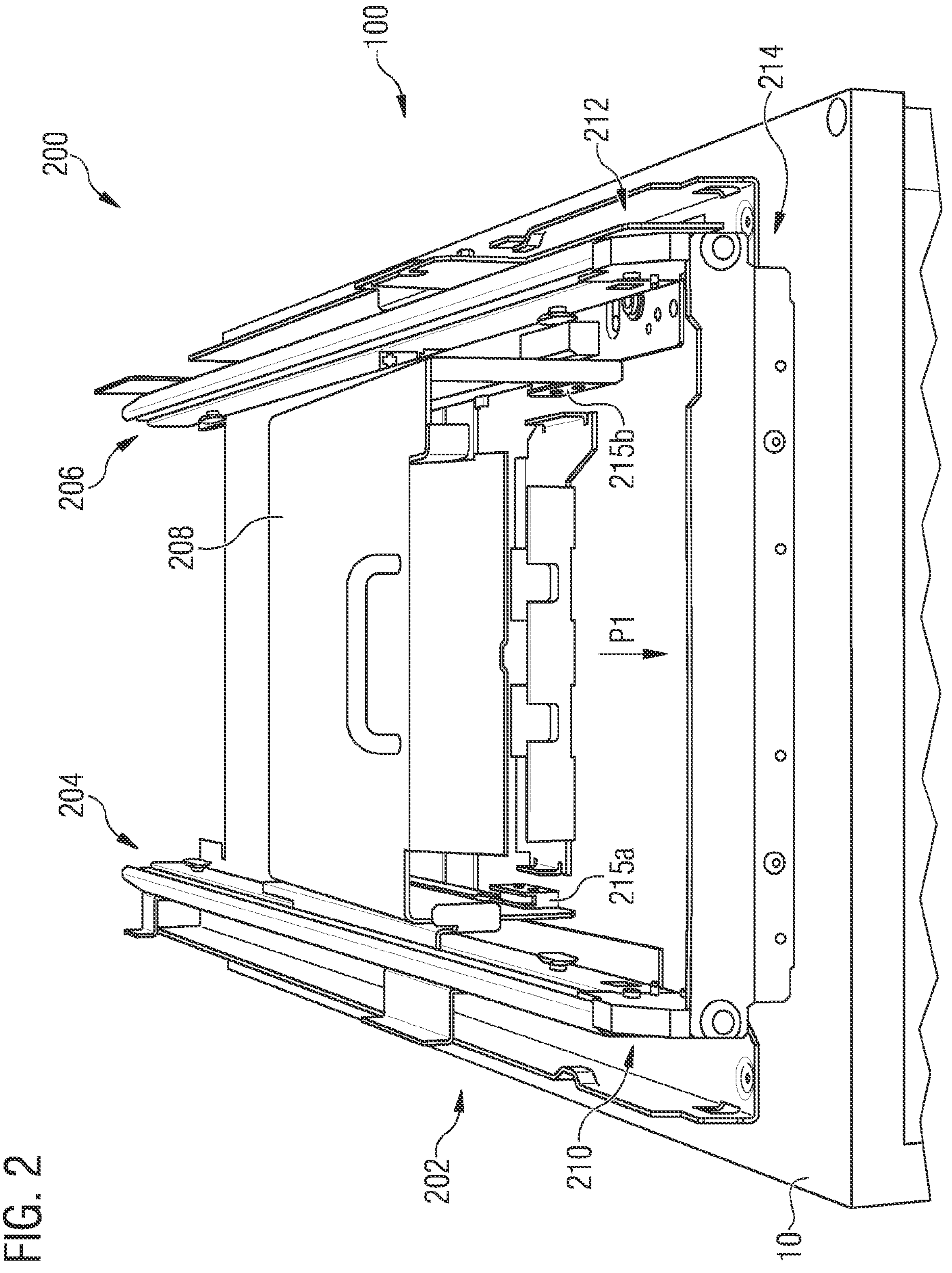
Figure 3:
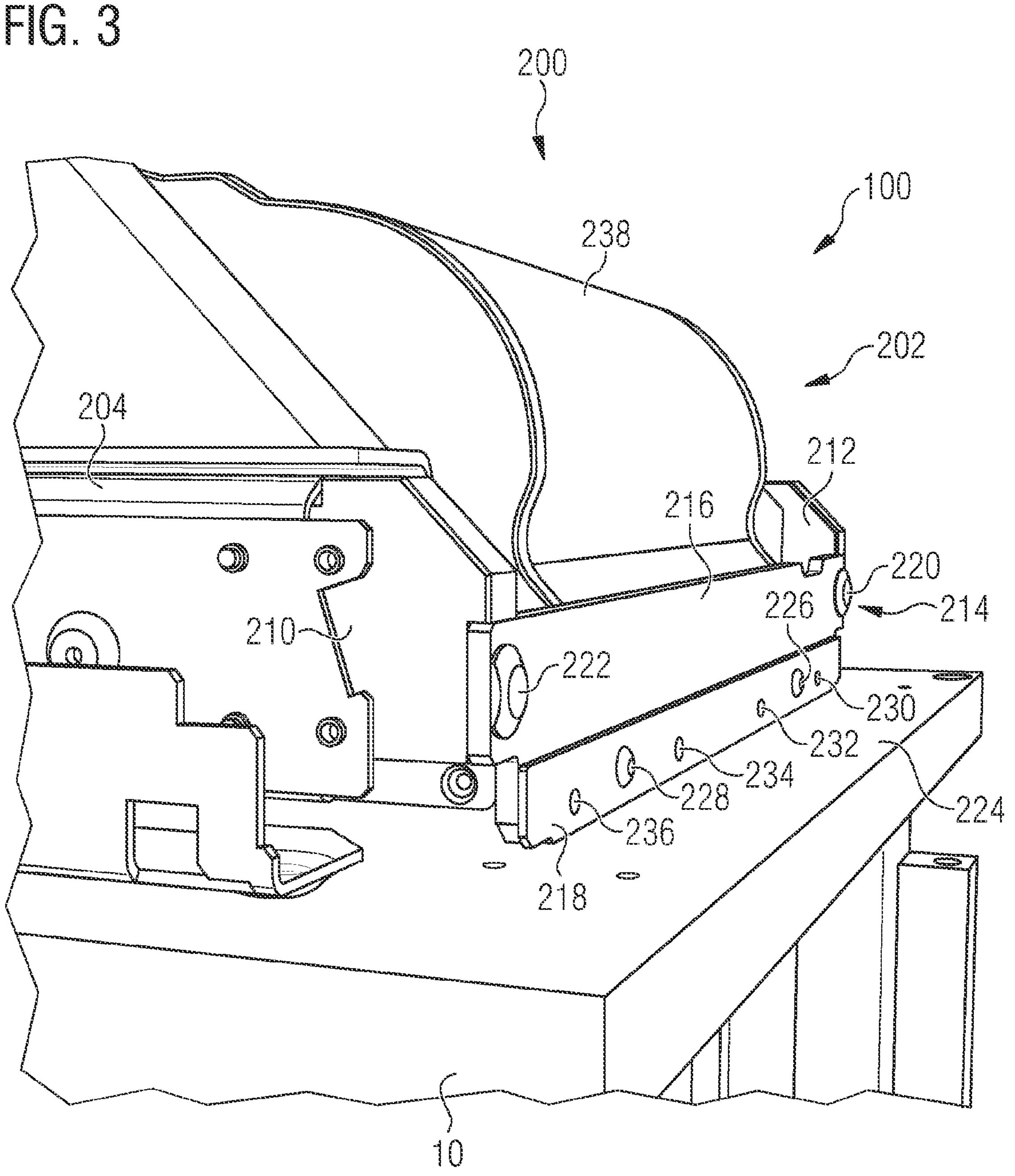
Figure 4:
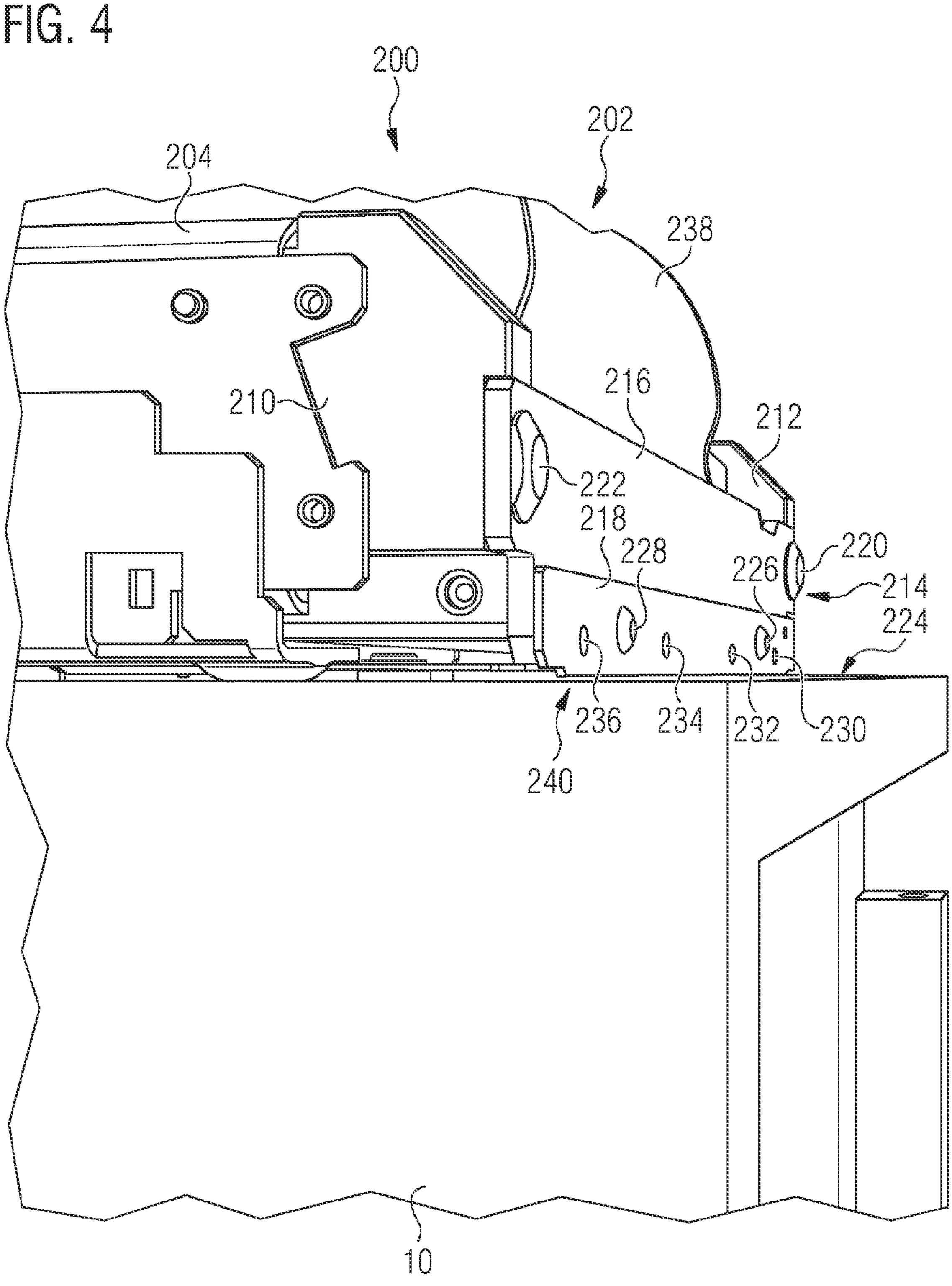
Figure 5:
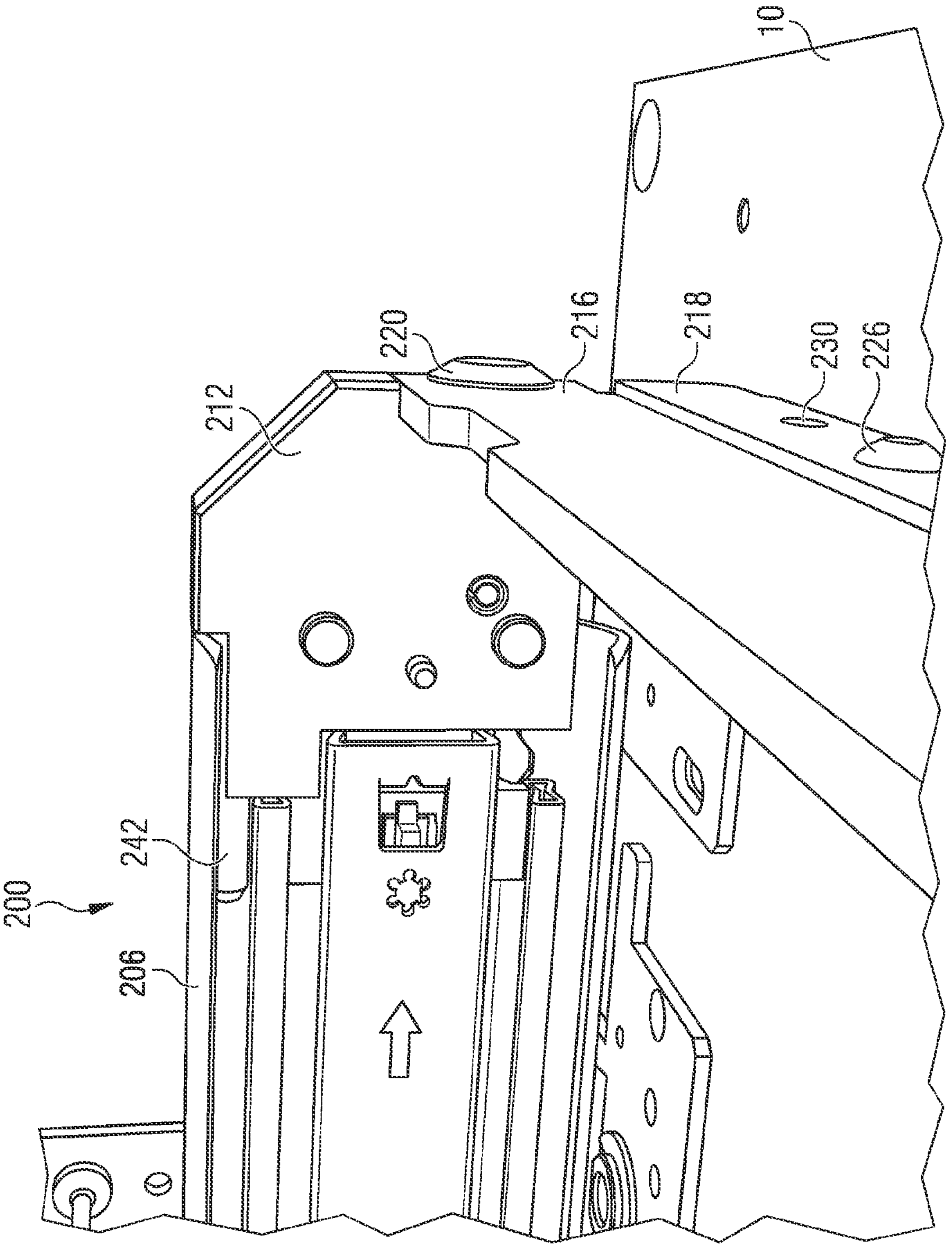
Figure 6:
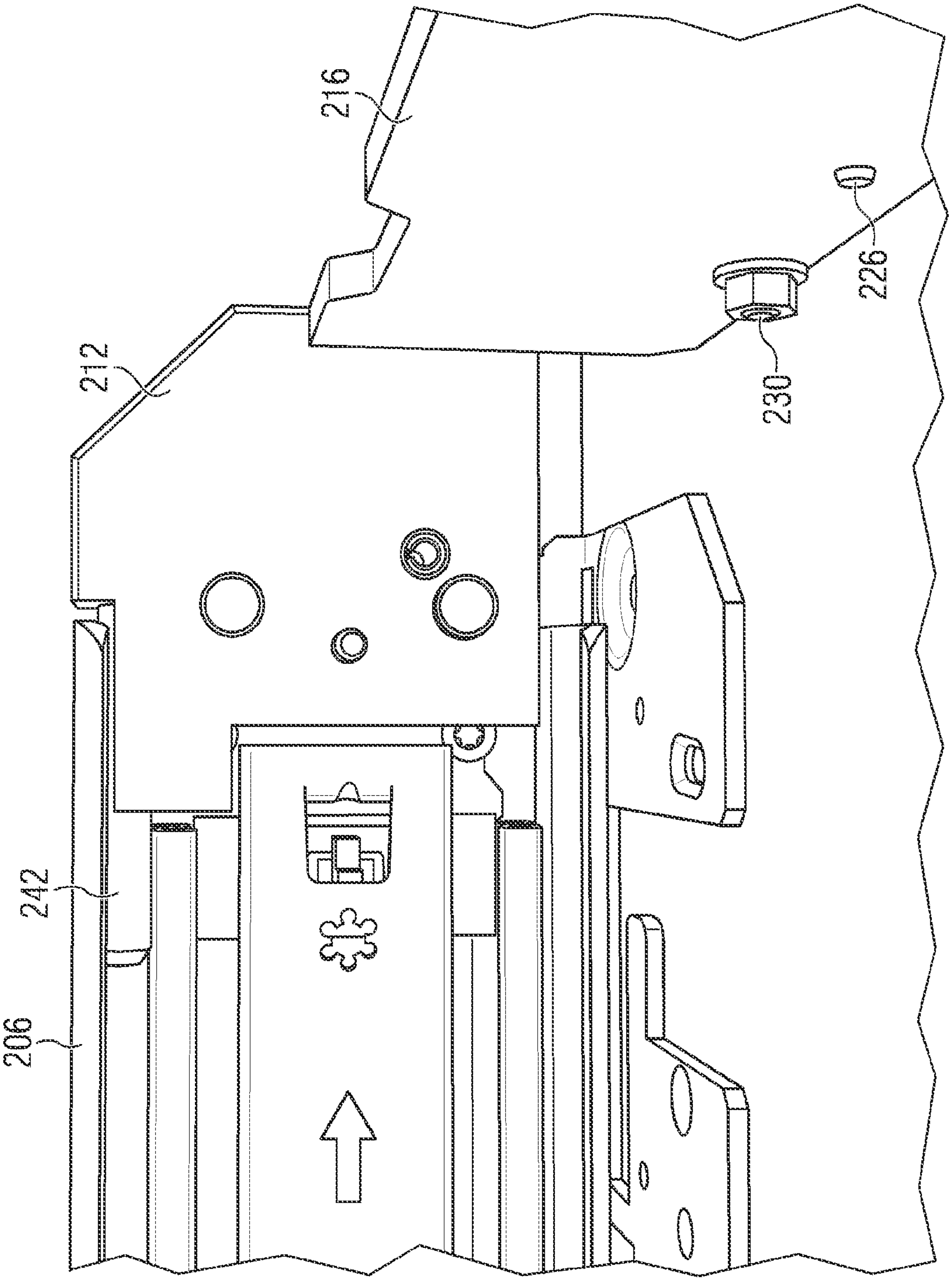
Figure 7:
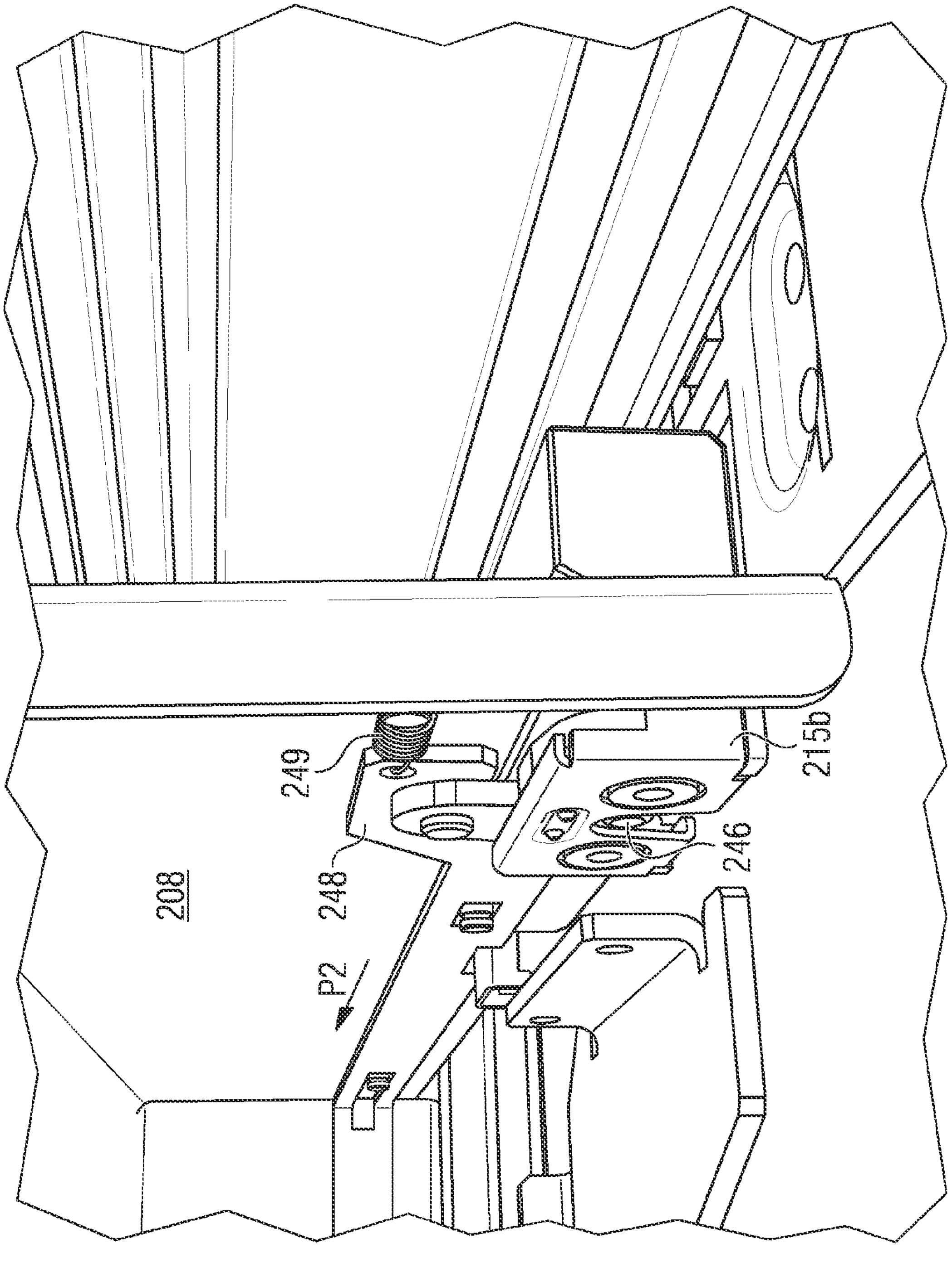
Figure 8:
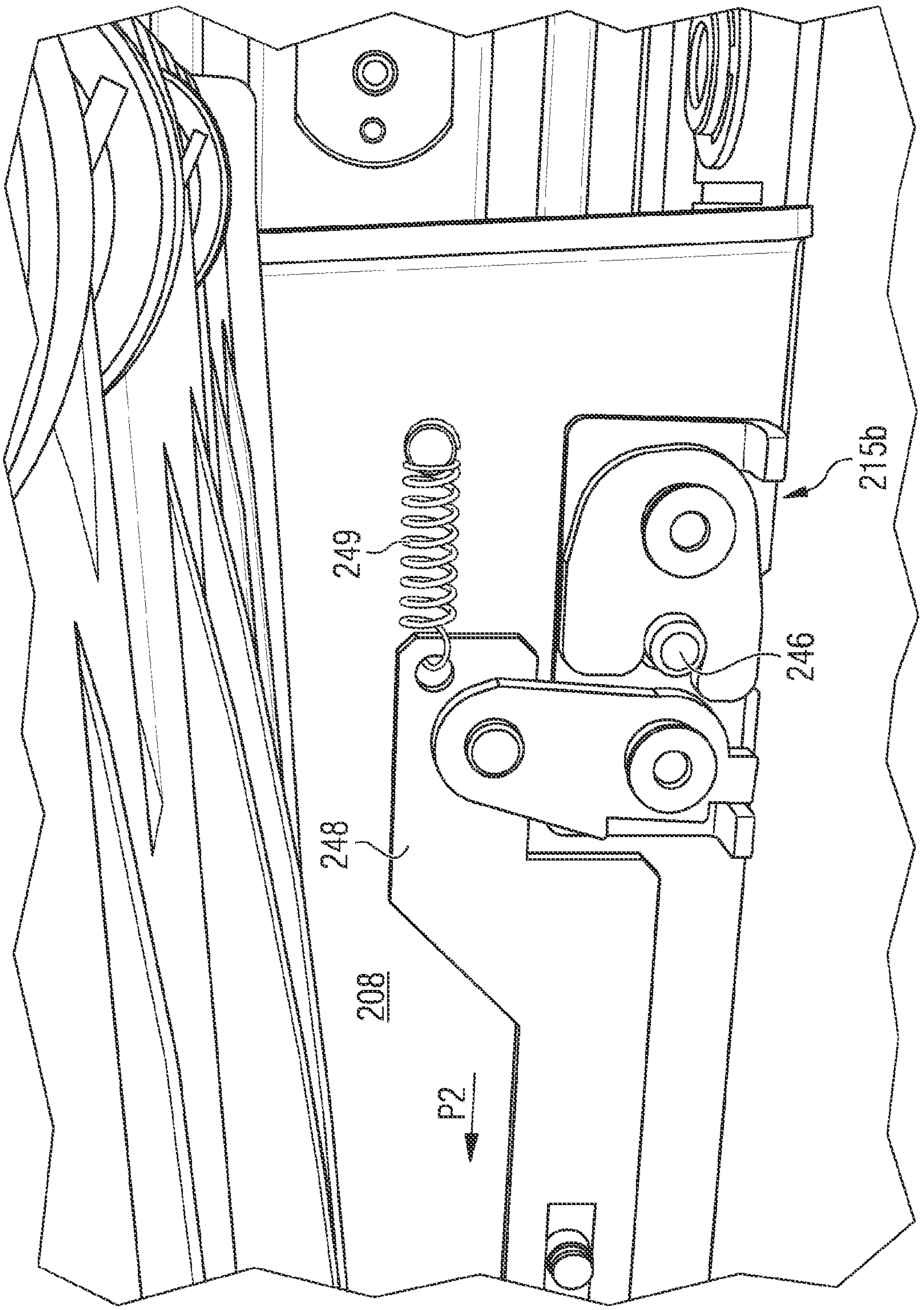
Figure 9:
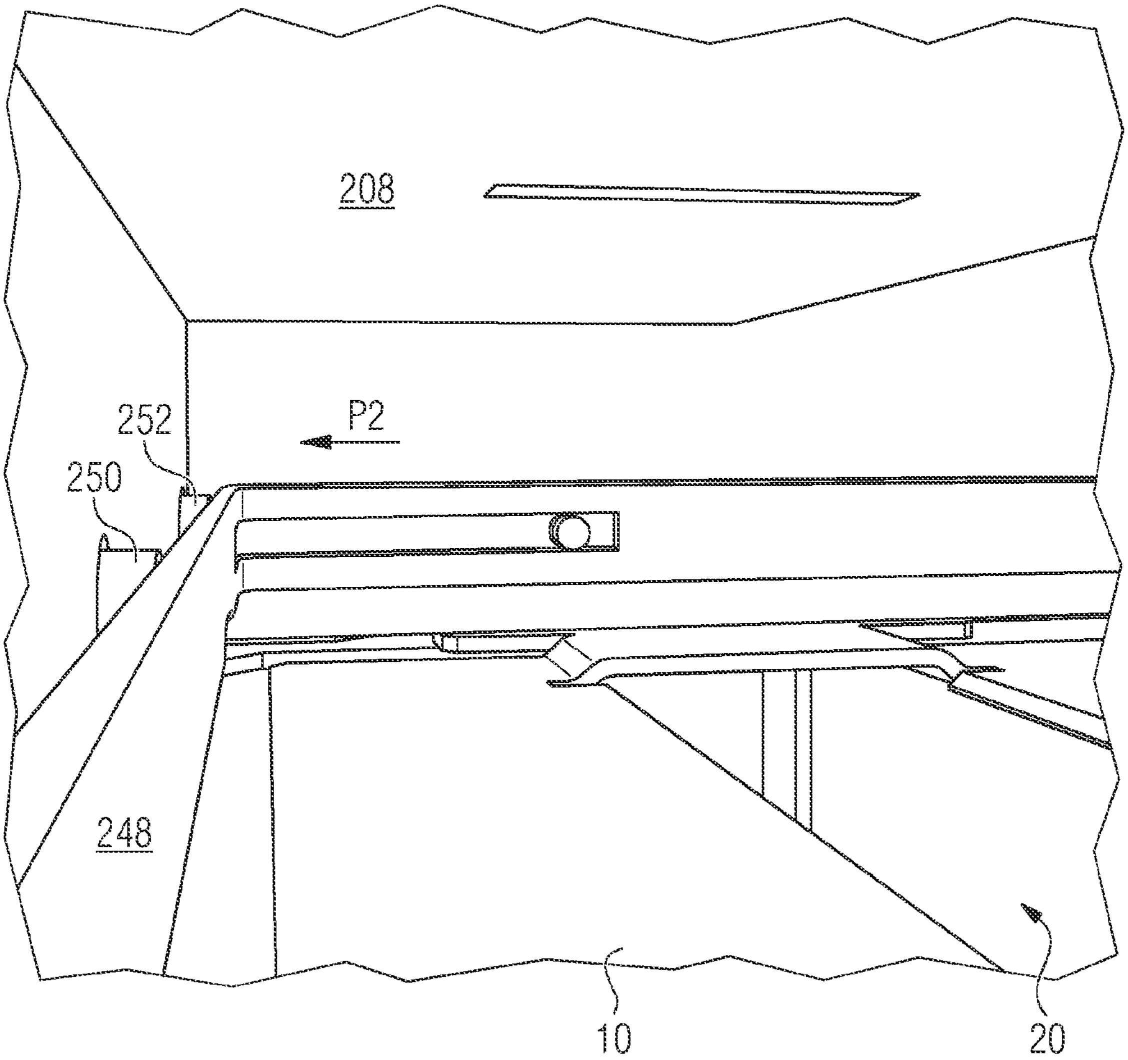
Figure 10:
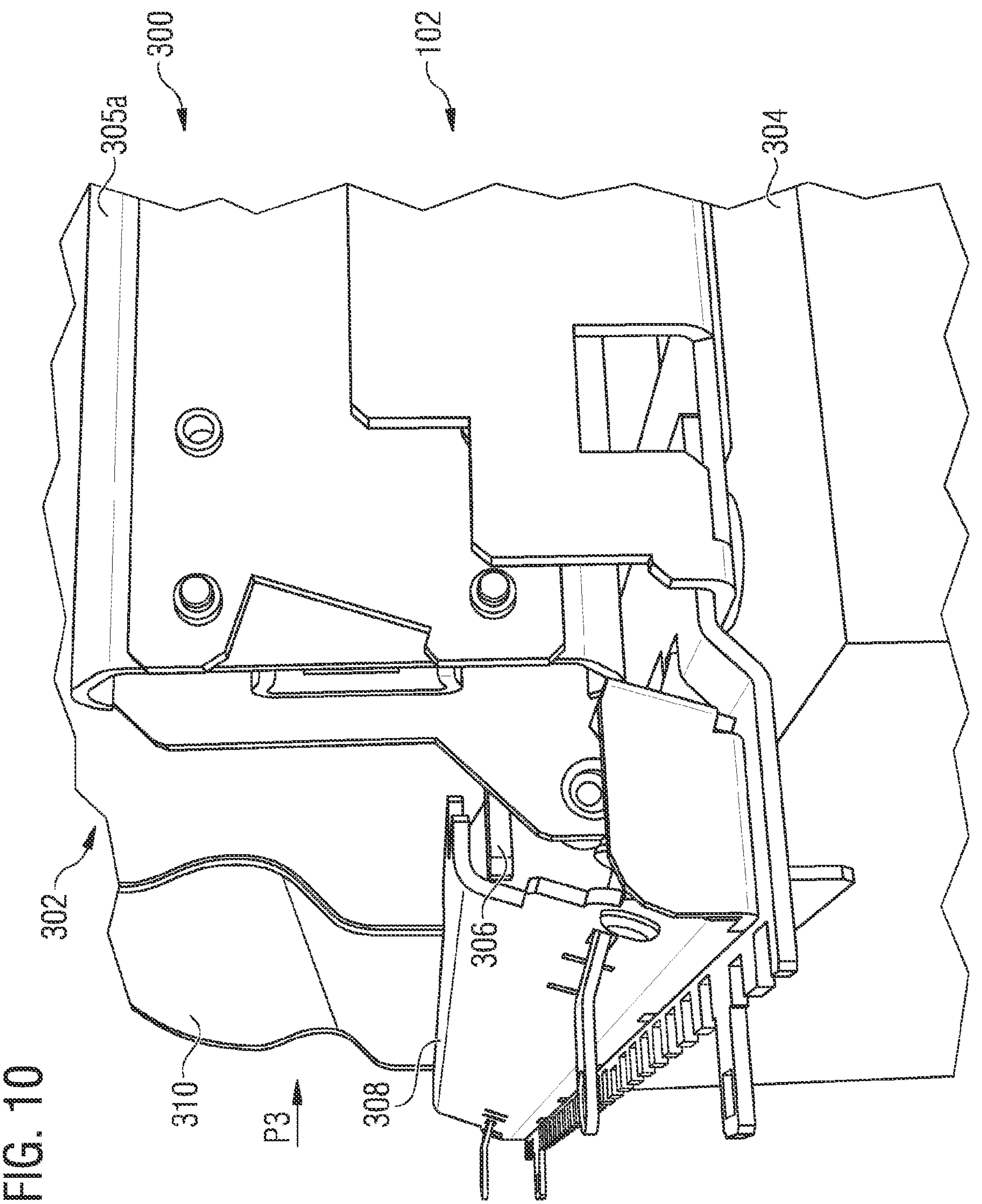
Figure 11:
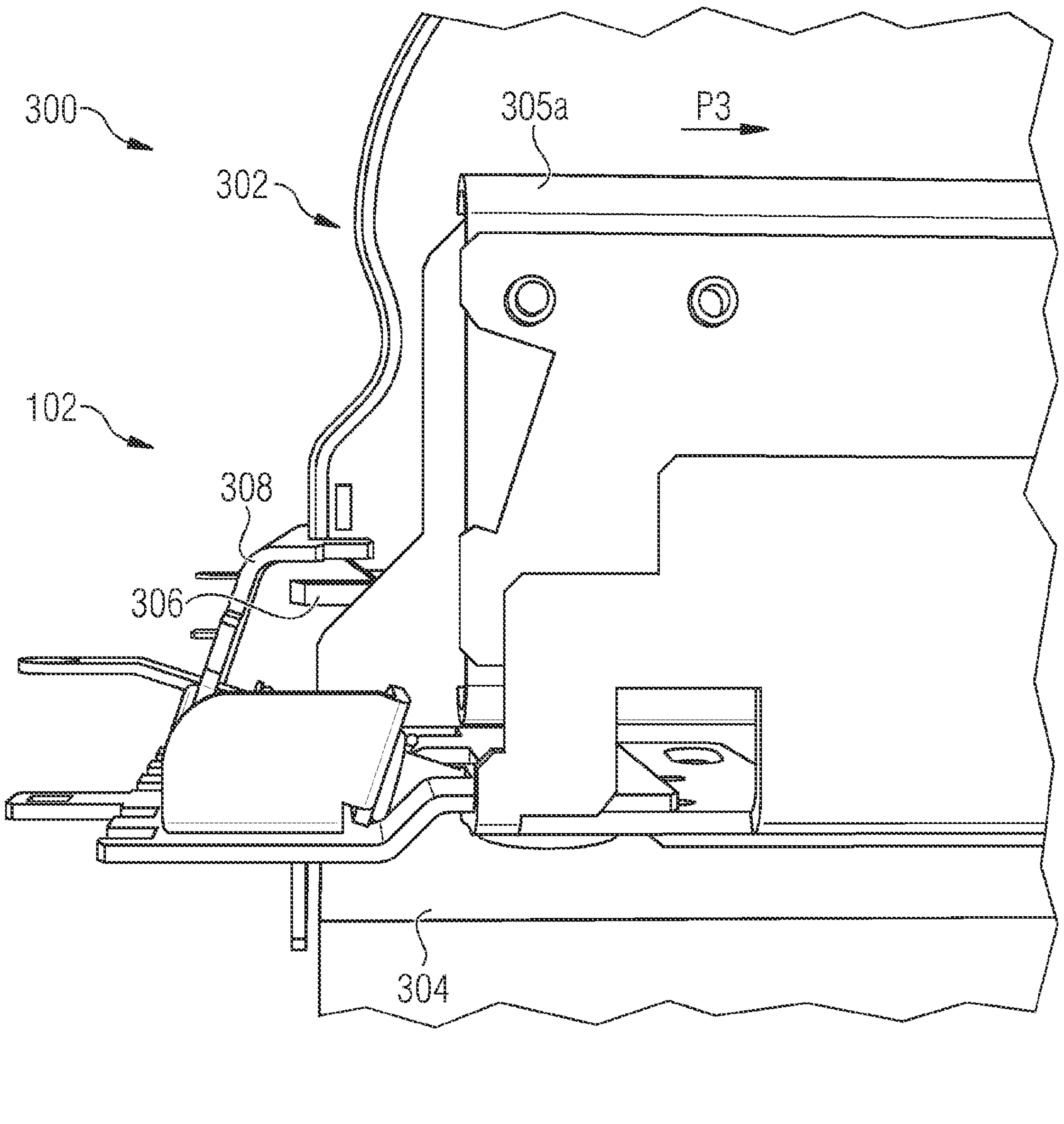
Figure 12:
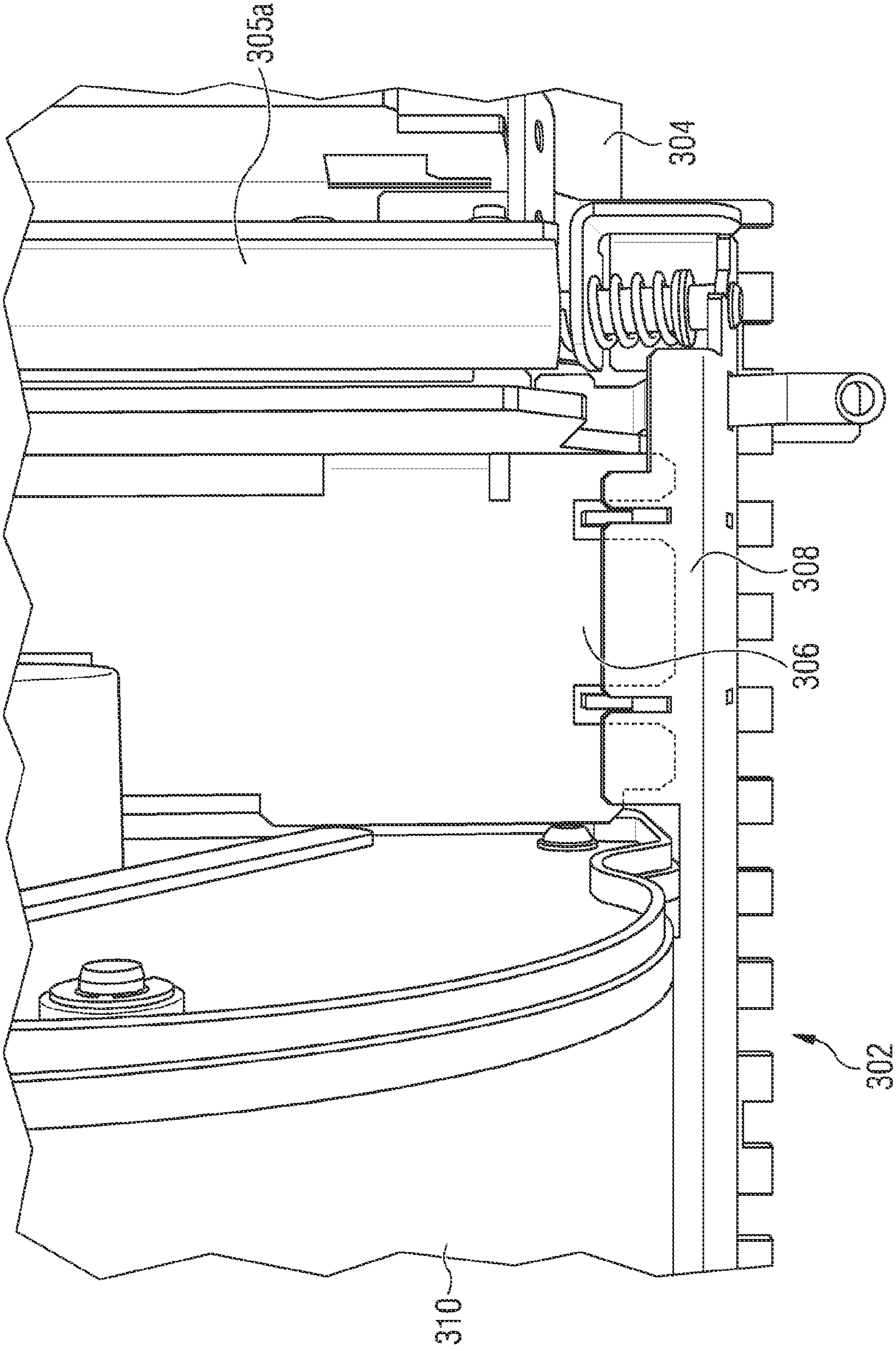
Figure 13:
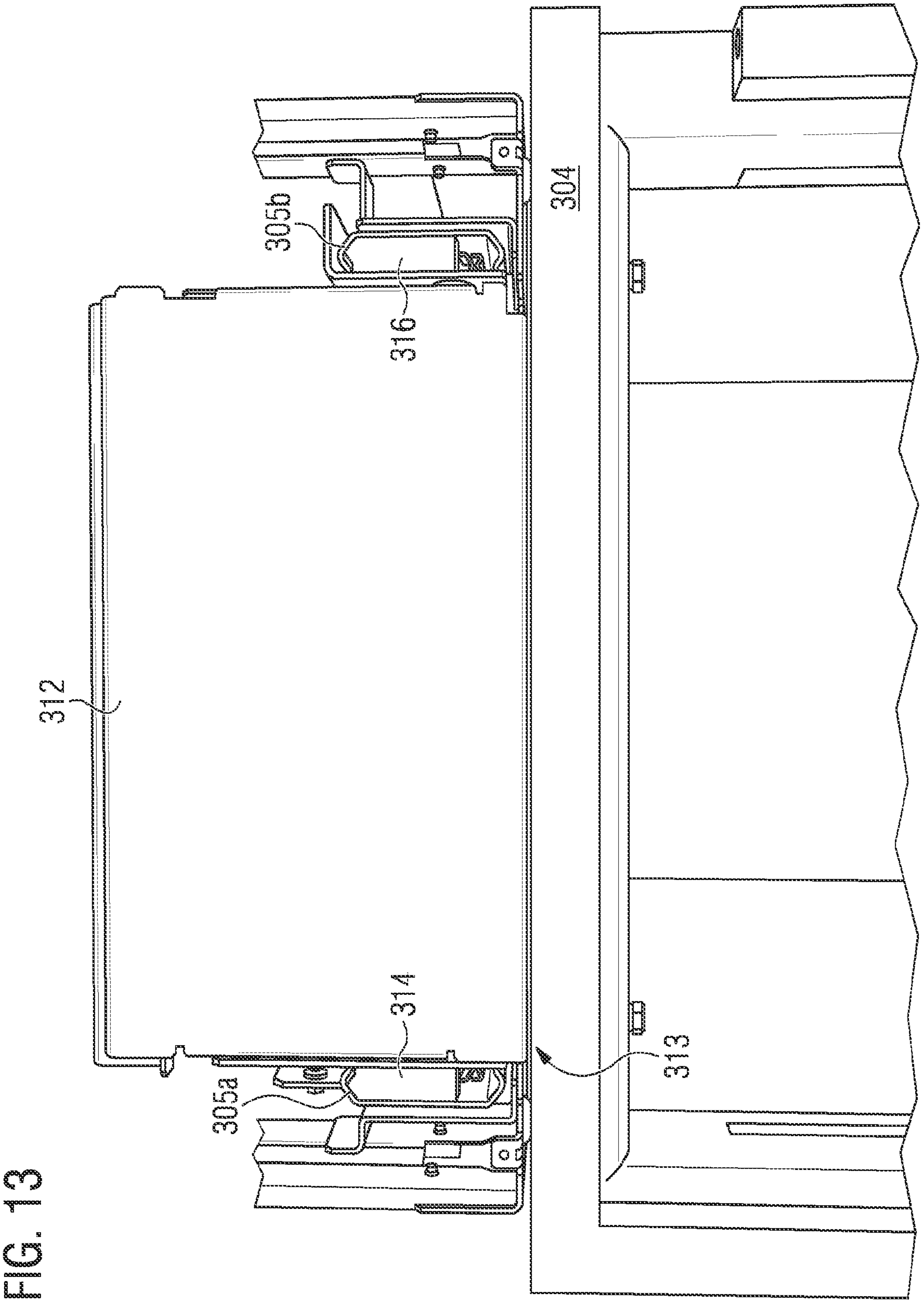
Figure 14:
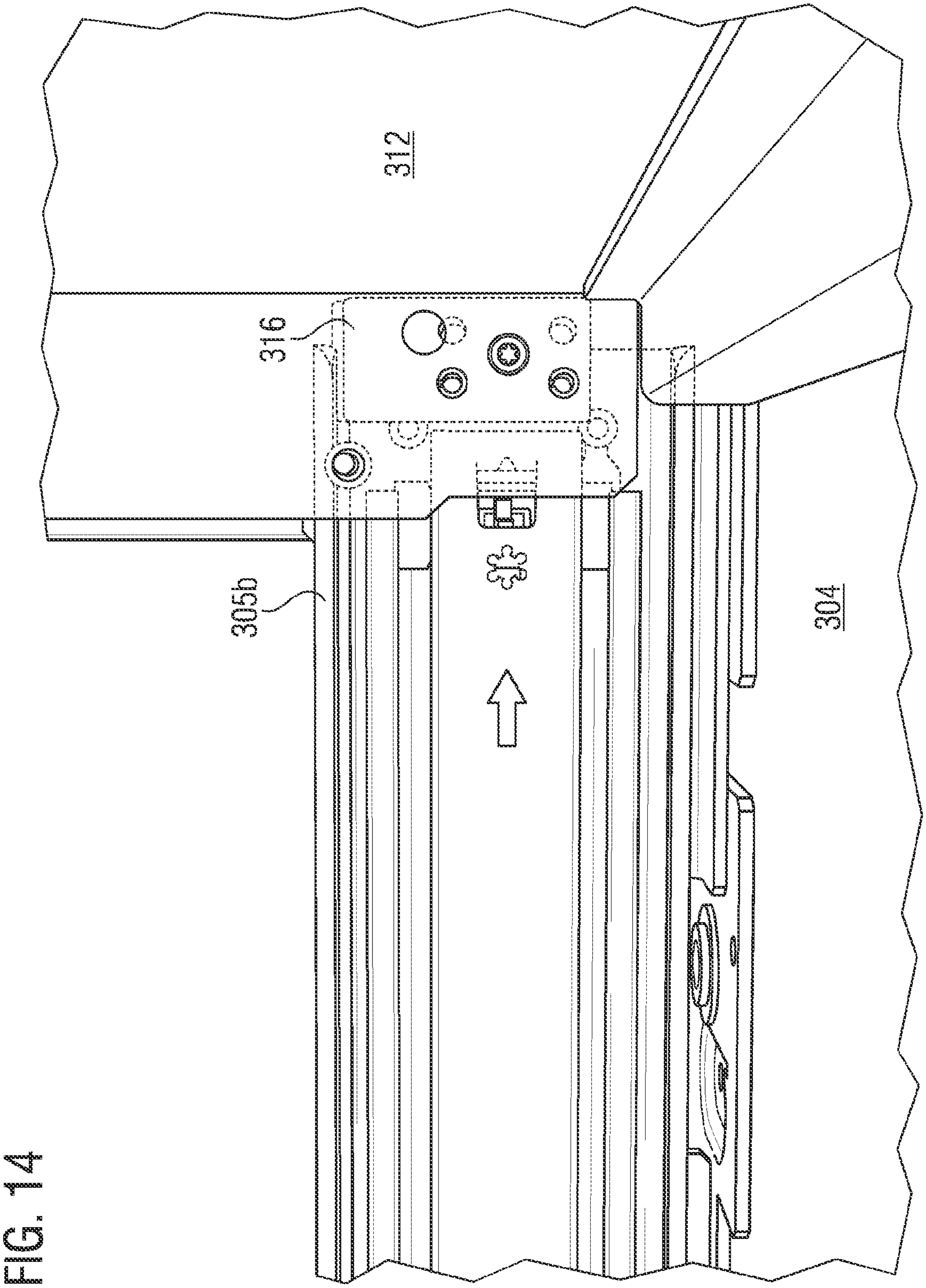
Figure 15:
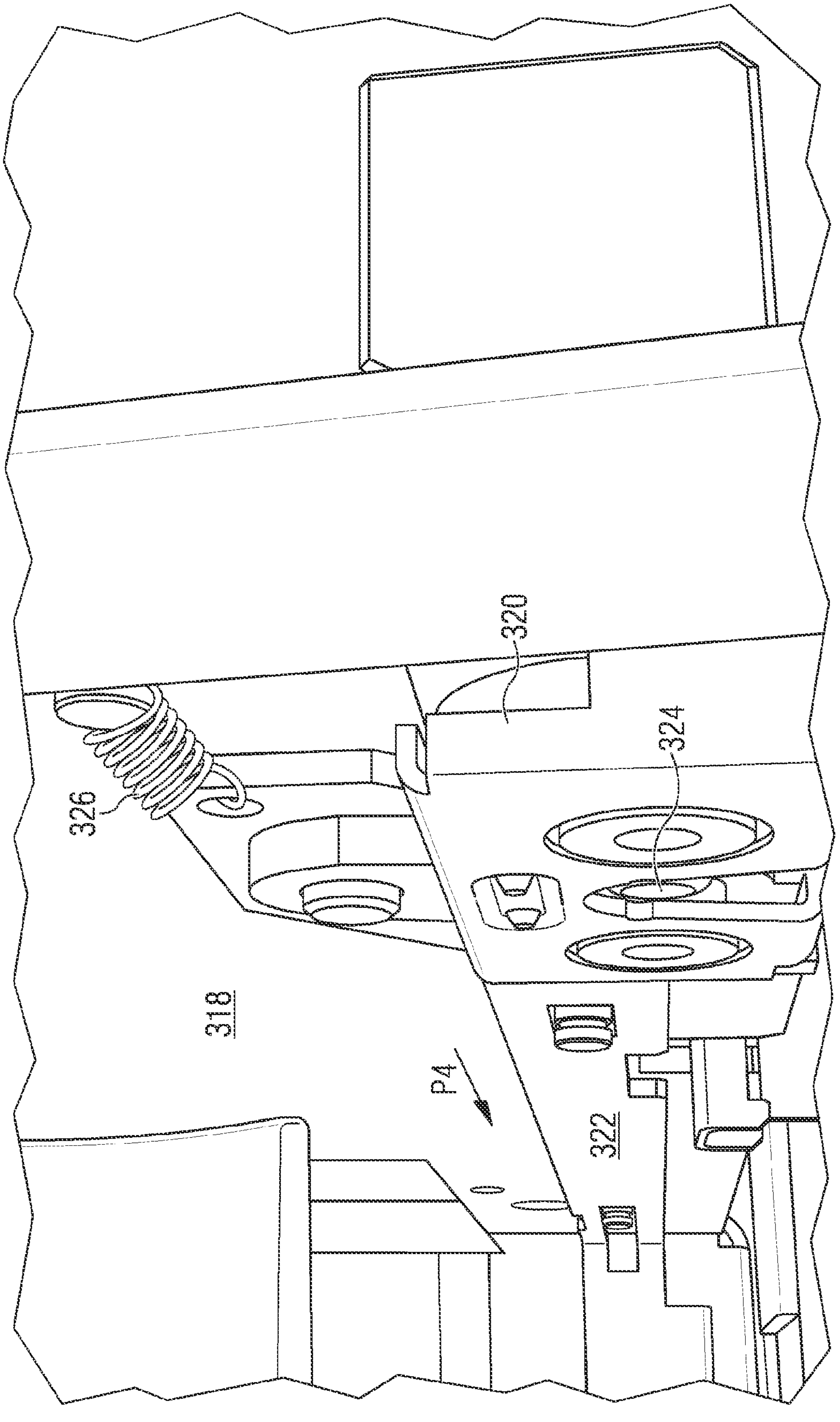
Figure 16:
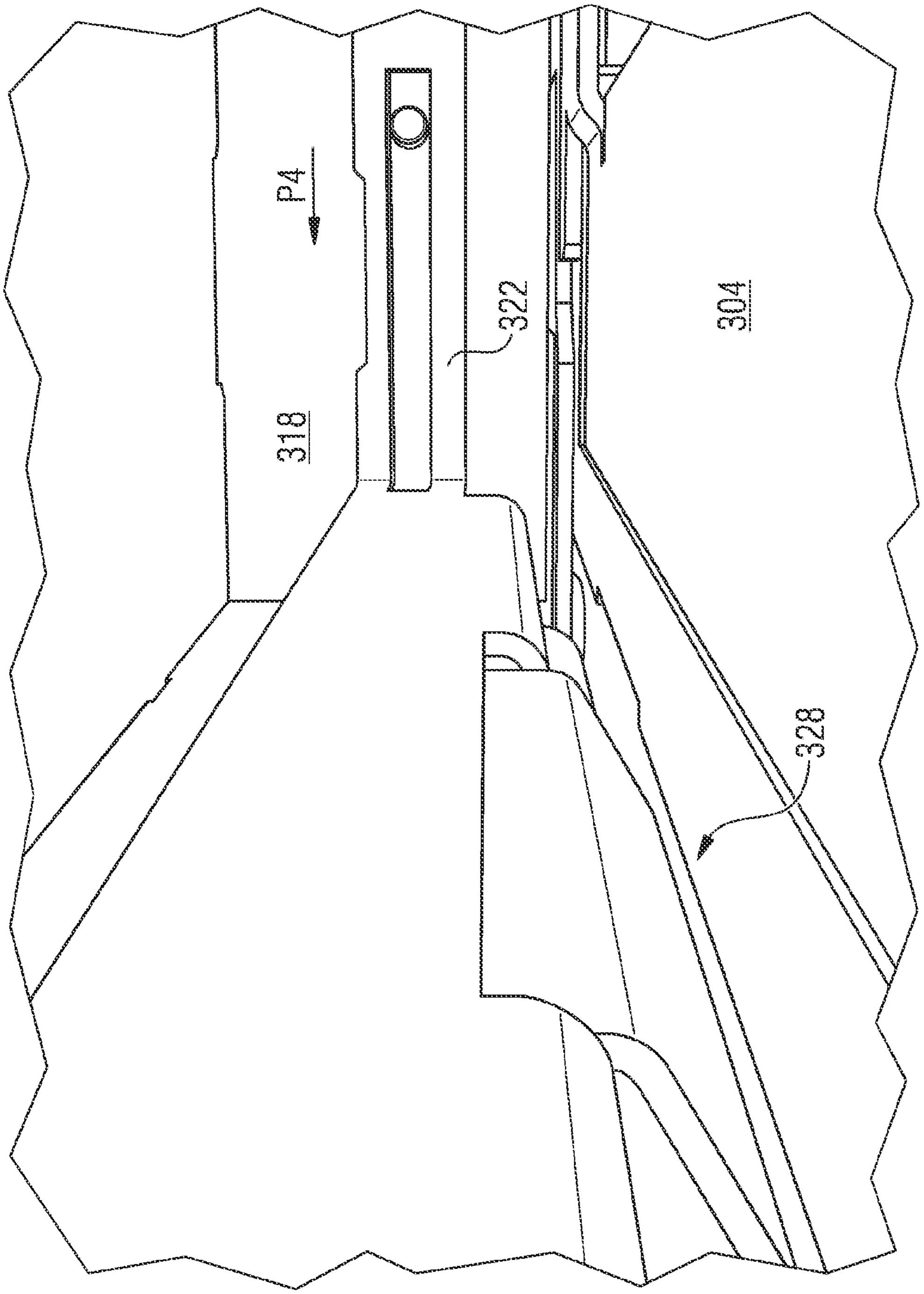

They show:

FIG. 1 a schematic partial cutaway side view of a device for handling paper money, FIG. 2 a front view of an arrangement for securing access according to a first exemplary embodiment, FIG. 3 a first side perspective view of the arrangement shown in FIG. 2 with a side perspective view of a securing plate, FIG. 4 a second lateral perspective view of the arrangement shown in FIG. 2 with a lateral perspective view of the securing plate, FIG. 5 a first detailed view of a securing element of the arrangement according to FIGS. 2 through 4, FIG. 6 a second detailed view of the securing element according to FIG. 5, FIG. 7 a first view of a securing hood as well as a locking element and an unlocking element of the arrangement according to FIGS. 2 through 6, FIG. 8 a second view of the securing hood with the locking element and the unlocking element according to FIG. 7, FIG. 9 a third view of the securing hood with the unlocking element according to FIG. 7 or 8, FIG. 10 a perspective view of a front side of a device for handling paper money with an arrangement according to a second exemplary embodiment, FIG. 11 a first detailed view of the device according to FIG. 10 with a first plate and a second plate for securing access, FIG. 12 a second detailed view of the device according to FIG. 11 with the first plate and the second plate, FIG. 13 a rear view of the device according to FIG. 10 with a securing plate and two securing elements, FIG. 14 a detailed side view of a securing element according to FIG. 13, FIG. 15 a detailed view of a securing hood with a locking element and an unlocking element, and FIG. 16 another detailed view of the securing hood with the unlocking element.

FIG. 1 shows a schematic partial side view of a device 100 for handling paper money. The device 100 is used for both depositing paper money by an operator and disbursing paper money to an operator, and is also referred to as a recycling automated teller machine. Alternatively, the device 100 may be used exclusively for disbursing paper money or depositing paper money.

Furthermore, the device 100 may be a device for handling paper money, in particular an automatic cash register system or a so-called automatic safe cash register.

The device 100 comprises a safe module 21 with a safe 10 in which four cash cassettes 12*a* through 12*d* are arranged and which protects the cash cassettes 12*a* through 12*d* against unauthorized access, in particular against theft and against attempts at manipulation. The safe 10 has a safe door 34 that can be opened and closed by a locking unit 36. The cash cassettes 12*a* through 12*d* are each arranged in a receiving tray 42*a* through 42*d* in the safe 10. Further, the safe module 21 comprises a housing having a front housing door 18. The safe 10 is arranged inside the housing. Alternatively, the safe module 21 comprises only the safe 10.

Further, the device 100 comprises a head module 11 having a front housing flap 15. The housing flap 15 is hinged to the remainder of the housing of the device 100 by a hinge 17 and can be pivoted upwardly by this hinge 17 to allow access, particularly by a maintenance technician, to a structural unit 40 in the head module 11 of the device 100 arranged above the safe module 21. In FIG. 1, the safe door 34, the housing door 18 and the housing flap 15 are shown in a closed state.

The configuration of the device 100 shown in FIG. 1 is also referred to as a front load. In this configuration, the safe door 34 and the structural unit 40, particularly an operating side of the structural unit 40, are accessible from the same side of the device 100. Alternatively, the safe door 34 and the control side of the structural unit 40 may be accessible from opposite sides of the device 100. In this case, we speak of a rearload configuration.

The cash cassettes 12*a* through 12*d* are used for storing and transporting paper money, such as banknotes and/or checks. The paper money is stored in the cash cassettes 12*a* through 12*d* in the form of a stack. One of these stacks is indicated in the first cash cassette 12*a*, for example. One banknote of this paper money stack is designated, for example, by reference character 13. In the operating position of the cash cassettes 12*a* through 12*d* shown in FIG. 1, the paper money 13 is arranged in the cash cassettes 12*a* through 12*d* standing on one of their edges, preferably on one of their longitudinal edges.

Each cash cassette 12*a* through 12*d* has an opening for feeding paper money 13 and for removing paper money 13. A separating and stacking unit 14*a* through 14*d* is arranged in front of each opening of a cash cassette 12*a* through 12*d*, with the aid of which, on the one hand, paper money 13 can be fed to the cash cassettes 12*a* through 12*d* and, on the other hand, paper money 13 stored in the cash cassettes 12*a* through 12*d* can be separated from the stacks of banknotes received in the cash cassettes 12*a* through 12*d* and removed from the cash cassette 12*a* through 12*d*, respectively. A diverter 16*a* through 16*d* is arranged in front of each separating and stacking unit 14*a* through 14*d*, with the aid of which paper money 13 to be fed to the cash cassettes 12*a* through 12*d* is branched off from a transport path 19 and fed to that separating and stacking unit 14*a* through 14*d* which is arranged in front of that cash cassette 12*a* through 12*d* into which the paper money 13 is to be transported.

Likewise, the diverters 16*a* through 16*d* serve to transport paper money 13 removed from the cash cassettes 12*a* through 12*d* to the transport path 19. The safe 10 further has an opening 20 in a wall through which paper money 13 transported along the transport path 19 can be transported into the safe 10 or out of the safe 10.

Further, the device 100 comprises a deposit and dispense tray 22 through which paper money 13 to be deposited can be input into the device 100 by an operator and paper money 13 to be withdrawn can be output to an operator. In the case of a cash-only dispensing machine, the deposit and dispense tray 22 is used only to disburse paper money 13; in the case of a deposit-only dispensing machine, the deposit and dispense tray 22 is used only to deposit paper money 13. The paper money 13 can be transported between the deposit and dispense trays 22 and a reading unit 26 by means of a first transport unit 24 preferably comprising a plurality of transport elements.

The transport of paper money 13 along the transport path 19 from the reading unit 26 to the cash cassettes 12*a* through 12*d* or from the cash cassettes 12*a* through 12*d* to the reading unit 26 is carried out with the aid of a second transport unit preferably comprising several transport elements. The paper money 13 deposited via the deposit and dispense tray 22 is separated and fed individually to the reading unit 26 with the aid of the first transport unit 24, with the aid of which the authenticity of the deposited paper money 13 and/or the nominal value and/or the serial number of the deposited paper money 13 are determined.

The temporary storage 30 can temporarily store paper money 13 that has been deposited and/or is to be paid out; in particular, the temporary storage 30 can temporarily store paper money 13 that is not suitable for payment and/or paper money 13 that has been deposited and identified by the reading unit 26 as not being genuine or paper money 13 that has not been removed by an operator. The buffer 30 is in particular a roller accumulator or an endless transport line. A control unit 28 controls the functions of the device 100.

In particular, the structural unit 40 comprises the deposit and dispense trays 22, the transport path 24, the reading unit 26, the control unit 28, and the buffer 30. The structural unit 40 is arranged above the safe 10 in the head module 11 such that paper money 13 can be transported from the safe 10 through the opening 20 into the structural unit 40. In particular, the structural unit 40 is arranged on a top surface of the safe 10.

With the housing door 18 and housing flap 15 closed and locked, an operator does not have access to interior structural units of the device 100, particularly the safe 10 and the structural unit 40 of the head module 11 of the device 100. Furthermore, an operator does not have access to the opening 20 of the safe 10 or the safe module 21.

FIG. 2 shows a front view of an arrangement 200 for securing access according to a first exemplary embodiment. The device 100 for handling paper money comprises the arrangement 200 and a structural unit 202. Individual elements of the structural unit 202 are hidden for better visibility of the access protection.

The structural unit 202 is arranged between two telescoping rails 204, 206. The telescopic rails 204, 206 each comprise at least two guide rails that are mounted within each other. A fixed guide rail of the telescopic rails 204, 206 is connected to the safe 10, in particular to a top surface of the safe 10, of the device 100. A movable guide rail of the telescopic rails 204, 206 is connected to the structural unit 202. Thus, the structural unit 202 is movable relative to the safe 10 by means of the telescopic rails 204, 206, and in particular the structural unit 202 is movable between a retracted state and an extended state. In FIG. 2, the structural unit 202 is shown in a retracted state. The direction of extension of the structural unit 202 is indicated by the arrow P1.

Alternatively, the telescopic rails 204, 206 each have more than two guide rails.

Below the structural unit 202 is the opening 20 of the safe 10. In FIG. 2, the opening 20 is covered by a securing hood 208 of the structural unit 202 and is therefore not visible. When the structural unit 202 is retracted, the security hood 208 secures the opening 20 of the safe 10 from unauthorized access.

Further, the structural unit 202 comprises two securing elements 210, 212 each of which engages a telescoping rail 204, 206. Further, the structural unit 202 comprises a securing plate 214. The securing plate 214 is arranged on a front side of the structural unit 202 and is connected to the structural unit 202 via the securing elements 210, 212.

In particular, the arrangement 200 comprises the following elements shown in FIG. 2 for securing access:

the securing hood 208,
the securing elements 210, 212, and
the securing plate 214.

The elements 208, 210, 212, 214 are arranged and connected to the structural unit 202 such that they are also moved when the structural unit 202 is moved.

It is further provided that the structural unit 40 is lockable in the retracted state shown in FIG. 2. To access the opening 20 in the safe 10, for example for maintenance purposes, the maintenance technician must unlock the structural unit in order to subsequently move it, i.e. pull it out.

Further, the securing hood 208 comprises two locking elements 215*a*, 215*b* each arranged on a left side and a right side of the securing hood 208. These locking elements 215*a*, 215*b* allow the securing hood 208 to be opened when the locking elements are unlocked. In particular, it is provided that the locking elements 215*a*, 215*b* is only possible in an extended state of the structural unit 202. The securing hood 208 is shown in FIG. 2 in a locked state.

In the event of an unauthorized access attempt, in particular a forcible access attempt, by an unauthorized person, the housing flap 15 as well as the structural unit 202 must be disassembled, in particular forcibly removed, in order to access the opening 20. The elements 208, 210, 212, 214 secure and protect the structural unit 202 against such an unauthorized access attempt by preventing or at least making it very difficult for the structural unit 202 to be pried open. This prevents criminal third parties from introducing explosives into the safe 10 through the opening 20. With reference to the following FIGS. 3 through 9, further details of the arrangement 200 are explained.

FIGS. 3 and 4 each show a side perspective view of the arrangement 200 with a side perspective view of the securing plate 214. The securing plate 214 comprises two portions, a first portion 216 fixedly connected to the structural unit 202 and a second portion 218 adjustable in height relative to the first portion 216. The first portion 216 of the securing plate 214 is connected to the securing elements 210, 212 by means of two fastening elements 220, 222. The fastening elements 220, 222 are arranged and configured such that they cannot be loosened at least in a retracted state of the structural unit 202. In particular, the fastening elements 220, 222 do not have screw head drives.

The second portion 218 of the securing plate 214 is reversibly connected to the first portion 216 by means of further fastening elements. During assembly of the securing plate 214, the second portion 218 may be attached to the first portion 216 such that, in a retracted state of the structural unit 202, the distance 240 between the second portion 218 and an exterior surface 224 of the safe 10 is minimal. In particular, the distance can be set to a value in a range of 0.1 mm to 3 mm, preferably to a value in a range of 0.3 mm to 1 mm, especially to a distance of 0.5 mm.

The distance is set in the retracted state of the structural unit 202 with the aid of a gauge. Here, the distance 240 of the second portion 218 from the outer surface 224 is fixed by two fastening elements 226, 228. The fastening elements 226, 228 are preferably screws, the screw head drive of which is accessible in the retracted state of the structural unit 202 and each of which is screwable into the first portion 216 through an elongated hole in the second portion 218. The further fastening elements 230, 232, 234, 236 can then be used to fasten the second portion 218 to the first portion 216 when the structural unit 202 is in an extended state such that the second portion 218 cannot be disengaged from the first portion 216 when the structural unit 202 is in a retracted state. For this purpose, the fastening elements 230, 232, 234, 236 are preferably screws which are each guided through a hole of the second portion 218 and through an elongated hole of the first portion 216 and are screwed to the rear side of the first portion 216 with a nut, in particular a self-locking nut. The fastening elements 230, 232, 234, 236 do not have a screw head drive on a front side of the second portion 218 accessible in the retracted state of the structural unit 202. Thus, the fastening elements 230, 232, 234, 236 cannot be loosened when the structural unit 202 is retracted.

Alternatively, the fastening elements 230, 232, 234, 236 may be setscrews spotted on a rear surface of the second portion 218 and threaded through the elongated hole in the first portion 216 to the rear surface of the first portion 216 using a nut.

Further shown in FIG. 3 is a deposit and dispense tray 238.

FIG. 4 shows the distance 240 between the outer surface 224 of the safe 10 and the second portion 216 of the securing plate 214. The small distance of 0.5 mm in particular prevents the insertion and application of massive tools, such as crowbars, and can thus make prying open and/or removing the structural unit 202 much more difficult.

Further, in FIG. 4, below the exterior 224 of the safe 10, the front 239 of the safe 10 is shown with the safe door 34 open.

FIGS. 5 and 6 each show detailed views of the securing element 212 of the arrangement 200. Individual elements of the structural unit 202 are hidden for better visibility. In the retracted state of the structural unit 202, the securing element 212 engages at least partially under a guide rail of a telescoping rail 206. In particular, the securing element 212 comprises a pin-shaped portion 242 that engages under the telescoping rail 206.

Alternatively, a separate plate may be provided under which the securing element 212 engages.

When the structural unit 202 is moved from an extended state to a retracted state, the securing element 212 is moved from a front side of the telescoping rail 206 under the telescoping rail 206.

The above explanations apply equally to the securing element 210 and the telescopic rail 204, which are arranged in mirror image on a left side of the device 100 and perform the same function as the securing element 212 and the telescopic rail 206.

The securing elements 210, 212 support the structural unit 202 upwardly against the telescoping rail 204, 206. In particular, an attempt to lever the structural unit 202 upwards is thus greatly impeded.

Further, FIG. 6 illustrates the rear side of the first portion 216 of the securing plate 214. Fastening elements 226 and 230 are visible there, with which the second portion 218 of the securing plate 214 is bolted to the first portion 216.

FIGS. 7 through 9 each show a view of the securing hood 208, as well as the locking element 215*b* and an unlocking element 248. The securing hood 208 is shown in the locked state. In this case, the locking elements 215*a*, 215*b* are locked to a fixed bolt 246 and the securing hood 208 cannot be opened, in particular swung upwards. The unlocking element 248 uses springs 249 to hold the locking elements 215*a*, 215*b* in a locked position. The unlocking element 248 is circumferentially arranged on three of the interior sides of the securing hood 208.

Securing hood 208 has a wall thickness of 3 mm in particular. The securing hood 208 is made of metal, preferably steel.

The unlocking element 248 can be used to unlock the locking elements 215*a*, 215*b* so that the locking elements 215*a*, 215*b* release the corresponding bolts 246. The unlocking element 248 is moved in the direction of the arrow P2. This movement of the unlocking element 248 is only possible in an extended state of the structural unit 202. In particular, the pins 250, 252 prevent movement of the unlocking element 248 when the structural unit 202 is in a retracted state. For this purpose, the pins 250, 252 are stationary, in particular rigid, connected to the safe 10 and do not move with the structural unit 202. Movement of the unlocking element 248 is performed manually, particularly by a maintenance technician, when the structural unit 202 is in the extended state. Alternatively, an automatic unlocking may be provided when the structural unit 202 is moved from the retracted state to the extended state. FIG. 9 further shows the opening 20 of the safe 10 to be secured.

The above explanations apply equally to the locking element 215*a*, which is arranged in mirror image on an opposite side of the securing hood 208 and, together with the unlocking element 248, performs the same function as the locking element 215*a*.

FIGS. 10 through 16 illustrate a second exemplary embodiment of an arrangement for securing access. The arrangement 300 comprises a structural unit 302 of a paper money handling device 102. In this regard, the device 102 is in a so-called rear-load configuration, in which access to a safe door of a safe 304 is from an opposite side of the device 102 than access to an operator side of the device 102 for handling paper money.

The structural unit 302 is connected to two telescoping rails 305*a*, 305*b* and is movable in a pull-out direction from the device 102. The pull-out direction is indicated by the P3 arrow. Since, in contrast to a front-load configuration, in a rear-load configuration access to the device 102 is possible from the operating side as well as from a rear side opposite to the operating side, both sides must also be taken into account when securing access.

FIGS. 10 through 12 are views of the front of the device 102 with a first plate 306 and a second plate 308, and show the structural unit 302 in a retracted position. Furthermore, a deposit and dispense tray 310 is shown. The first plate 306 is fixedly attached to the structural unit 302 and moves with the structural unit 302 as the structural unit 302 is pulled out. In contrast, the second plate 308 is fixedly attached to the safe 304. In the retracted state of the structural unit 302, the first plate 306 is arranged between the second plate 308 and a top surface of the safe 304. In particular, the first plate 306 is arranged between a portion of the second plate 308 parallel to the top of the safe 304 and the top of the safe 304. The first plate 306 is thereby arranged to have a distance to the second plate 308 and/or to the top of the safe 304 preferably in a range of 0.1 mm to 5 cm, in particular in a range of 0.5 cm to 3 cm. Further, the second plate 308 is configured and shaped to prevent tools, such as pry bars, from being placed under the first plate 306. This makes it much more difficult to pry open the structural unit 302 from the operator side.

FIG. 13 is a rear view of the device 102 with a securing plate 312 and two securing elements 314, 316. The structural unit 302 is arranged between and connected to the telescoping rails 305*a*, 305*b*. The securing plate 312 and the securing elements 314, 316 have the same function as described above for the corresponding elements 214, 210, 212. However, the securing plate 312 of the structural unit 302 is not adjustable in height. Nevertheless, a distance 313 between the securing plate 312 and an outer surface of the safe 304 is in a range of 0.1 cm to 1 cm, preferably at 0.5 cm.

In an alternative embodiment, the securing plate 312 may be adjustable in height, thereby allowing the distance of the securing plate 312 from the exterior of the safe 304 to be adjustable, as described for the securing plate 214 above.

Further, in FIG. 13, below the securing plate 312, the safe 304 is shown with the safe door 34 open.

The securing elements 314, 316 at least partially engage under the telescoping rails 305*a*, 305*b* in a retracted state of the structural unit 302.

FIG. 14 shows a detailed side view of the securing element 316. The securing element 316 is arranged behind and connected to the securing plate 312.

First, the small distance between the securing plate 312 and the outside of the safe 304 prevents the insertion and application of solid tools, and second, the securing elements 314, 316 support the structural unit 302 upwardly against the telescoping rails 305*a*, 305*b*. In particular, an attempt to lever the structural unit 302 upwards is thus greatly impeded.

FIGS. 15 and 16 each show a detailed view of a securing hood 318, and a locking element 320 and an unlocking element 322 of the structural unit 302. The securing hood can be locked as described for FIGS. 7 through 9. The securing hood 318 is shown in a locked state. In this case, locking elements 320 lock on a bolt 324 and the securing hood 208 cannot be opened, in particular swung upwards. Furthermore, another locking element not visible in FIG. 15 may be provided.

The unlocking element 322 uses springs 326 to hold the locking elements 320 in a locked position. The unlocking element 322 can be used to unlock the locking elements 320. The unlocking element 322 is moved in the direction of the arrow P4. This movement of the unlocking element 322 is only possible in an extended state of the structural unit 202. For this purpose, a mechanism 328 is provided that allows from outside the securing hood 318 to move the unlocking element in the direction of the arrow P4.

LIST OF REFERENCE CHARACTERS

10, 304 Safe
11 Head module
12*a* through 12*d* Cash cassettes
13 Paper money
14*a* through 14*d* Separating and stacking unit
15 Housing flap
16*a* through 16*d* Diverter
17 Hinge
18 Housing door
19 Transport path
20 Opening
21 Safe module
22, 238, 310 Deposit and dispense tray
24 Transport unit
26 Reading unit
28 Control unit
30 Intermediate storage
34 Safe door
36 Closing unit
40, 202, 302 Structural unit
42*a* through 42*d* Receiving tray
100, 102 Device for handling paper money
200, 300 Arrangement for securing access
204, 206, 305*a*, 305*b* Telescopic rail
208, 318 Securing hood
210, 212, 314, 316 Securing element
214, 312 Securing plate
215*a*, 215*b*, 320 Locking element
216 First portion of the securing plate
218 Second portion of the securing plate
220, 223, 226, 228, 230, 232, 234, 236 Fastening elements
224 Outside of the safe
239 Front side of the safe
240, 313 Distance
242 Pin-shaped portion of the securing element
246, 324 Bolts
248, 322 Unlocking element
249, 326 Spring
250, 252 Pin
306 First plate
308 Second plate
328 Unlocking mechanism

The invention claimed is:

1. An arrangement for securing access to at least one opening in a wall of a safe module of a device for handling paper money, the arrangement comprising:

a structural unit which is arranged with two telescopic rails and is connected to the safe module in such a way that, in a retracted state of the telescopic rails, paper money can be transported through the opening between the safe module and the structural unit;

wherein the structural unit has at least one securing plate arranged between the telescopic rails, the securing plate having an adjustable distance from an outer side of the wall of the safe module; and wherein the structural unit comprises a securing hood arranged about the opening, the securing hood having at least four side walls.

2. The arrangement for securing access to at least one opening in a wall of a safe module of a device for handling paper money, according to claim 1, wherein the structural unit comprises at least a first plate, wherein the safe module comprises a second plate which is fixedly connected to the safe module, and wherein the first plate in the retracted state of the structural unit is arranged between the outer side of the safe module and a portion of the second plate extending at a distance from the outer side.

3. The arrangement according to claim 1, wherein the structural unit is arranged between two telescopic rails and is extendable by the telescopic rails in an extension direction of the telescopic rails and is movable between the retracted state and an extended state.

4. The arrangement according to claim 1, wherein the extension direction of the telescopic rails is parallel to the outer side of the wall of the safe module.

5. The arrangement according to claim 1, wherein the structural unit additionally comprises at least two securing elements, each of which is in engagement with one of the telescopic rails when the structural unit is in the retracted state.

6. The arrangement according to claim 5, wherein the securing elements engage in the telescopic rails from a direction parallel to the extension direction of the telescopic rails, in particular from this direction by a movement of the structural unit from the extended state to the retracted state into a region of the telescopic rails.

7. The arrangement according to claim 5, wherein the securing elements engage the telescoping rails opposite the direction of extension of the telescoping rails.

8. The arrangement according to claim 5, wherein the securing elements engage the telescopic rails such that movement of the securing element in at least one direction perpendicular to the outer side of the wall is not possible and thus movement of the structural unit in the same direction is not possible.

9. The arrangement according to claim 1, wherein the securing plate is parallel to the outer surface of the wall.

10. The arrangement according to claim 1, wherein the securing plate comprises a height-adjustable portion with the aid of which the distance of the securing plate from the outer side of the wall of the safe module can be adjusted, in particular in a range from 0.1 mm to 3 mm, preferably in particular to a distance of 0.5 mm.

11. The arrangement according to claim 1, wherein the securing plate is arranged at and connected to the front end of the telescopic rails in the pull-out direction in a retracted state of the structural unit.

12. The arrangement according to claim 1, wherein the securing plate is arranged at a front end of the structural unit in the pull-out direction.

13. The arrangement according to any one of claim 1, wherein the first plate is arranged at a rear end of the structural unit in the pull-out direction and the second plate is arranged at a corresponding rear side of the safe module.

14. The arrangement according to claim 3, wherein the securing hood comprises at least one locking element which is unlockable only in an extended state of the structural unit by an unlocking element so that the securing hood is movable into an open position.

15. The arrangement according to claim 14, wherein the securing hood is made of metal, in particular steel, and/or has a wall thickness in the range from 1 mm to 10 mm.

* * * * *